United States Patent
Kwon et al.

(10) Patent No.: US 11,469,431 B2
(45) Date of Patent: Oct. 11, 2022

(54) SYSTEM AND METHOD FOR ESTIMATING CONCENTRATION OF HYDROGEN IN FUEL CELL

(71) Applicants: Hyundai Motor Company, Seoul (KR); Kia Motors Corporation, Seoul (KR)

(72) Inventors: Soon Woo Kwon, Gyeonggi-do (KR); Hyun Jae Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/814,311

(22) Filed: Mar. 10, 2020

(65) Prior Publication Data

US 2021/0104760 A1 Apr. 8, 2021

(30) Foreign Application Priority Data

Oct. 8, 2019 (KR) .......................... 10-2019-0124867

(51) Int. Cl.
*H01M 8/0444* (2016.01)
*H01M 8/0438* (2016.01)

(52) U.S. Cl.
CPC ... *H01M 8/04447* (2013.01); *H01M 8/04388* (2013.01)

(58) Field of Classification Search
CPC .................................................. H01M 8/0477
See application file for complete search history.

(56) References Cited

U.S. PATENT DOCUMENTS

| 2004/0229088 | A1* | 11/2004 | Hayashi | H01M 8/04589 429/429 |
| 2008/0152972 | A1* | 6/2008 | Igarashi | H01M 8/04447 429/410 |
| 2008/0233445 | A1* | 9/2008 | Nakayama | H01M 8/04097 429/449 |
| 2009/0092868 | A1* | 4/2009 | Orihashi | H01M 8/04955 429/410 |
| 2010/0190080 | A1* | 7/2010 | Hasuka | H01M 8/04805 429/446 |
| 2016/0240875 | A1* | 8/2016 | Rama | H01M 8/241 |
| 2018/0294497 | A1* | 10/2018 | Asai | H01M 8/04447 |

FOREIGN PATENT DOCUMENTS

KR 101459815 B1 11/2014

* cited by examiner

*Primary Examiner* — Brian R Ohara
(74) *Attorney, Agent, or Firm* — Fox Rothschild LLP

(57) ABSTRACT

A system for estimating a concentration of hydrogen in a fuel cell is provided. The system includes a hydrogen supply line supplying the hydrogen to the fuel cell and a time measurement sensor measuring a time duration from a point in time when an operation of the fuel cell ends to a point in time when the fuel cell restarts. A controller estimates an amount of air introduced into the fuel cell during the time duration using the measured time duration and estimates a concentration of hydrogen in the hydrogen supply line at the time of restarting the fuel cell based on the measured time duration and the estimated amount of introduced air.

9 Claims, 3 Drawing Sheets

SYSTEM AND METHOD FOR ESTIMATING CONCENTRATION OF HYDROGEN IN FUEL CELL

CROSS REFERENCE TO RELATED APPLICATION

The present application claims priority to Korean Patent Application No. 10-2019-0124867, filed Oct. 8, 2019, the entire contents of which is incorporated herein for all purposes by this reference.

BACKGROUND

1. Technical Field

The present disclosure relates to a system and method for estimating a concentration of hydrogen in a fuel cell, and more particularly, to a technology of more accurately estimating a concentration of hydrogen in an anode of the fuel cell when the fuel cell is turned off.

2. Description of the Related Art

A fuel cell converts chemical energy into electric energy using a redox reaction of hydrogen and oxygen supplied from a hydrogen supply device and an air supply device, respectively, and the fuel cell includes a fuel cell stack that produces electric energy, a cooling system that cools the fuel cell stack, and the like. In other words, hydrogen is supplied to the anode of the fuel cell and an oxidation reaction of hydrogen is performed in the anode, such that protons and electrons are generated. The generated protons and electrons move to a cathode through an electrolyte membrane and a bipolar plate. In the cathode, water is produced through an electrochemical reaction in which the protons and the electrons moving from the anode, and oxygen in the air participate, and electric energy is generated from such a flow of electrons.

Particularly, a concentration of hydrogen supplied to the anode of the fuel cell needs to be maintained at an appropriate level, and thus an appropriate hydrogen purge control is performed in a hydrogen supply line. The hydrogen purge control is generally performed to estimate a concentration of hydrogen in real time and maintain the concentration of hydrogen at an appropriate level. According to the related art, since it is difficult to measure a concentration of hydrogen in the anode of the fuel cell, a technology of continuously estimating a concentration of hydrogen using an initial concentration of hydrogen in the anode has been used. However, it is difficult to accurately estimate the initial concentration of hydrogen in the anode at the time of starting of the fuel cell. In particular, hydrogen is over-supplied to compensate for an insufficient estimation accuracy in an initial stage of the starting, which results in deterioration of fuel efficiency.

The contents described as the related art have been provided merely to assist in understanding the background of the present disclosure and should not be considered as corresponding to the related art known to those having ordinary skill in the art.

SUMMARY

An object of the present disclosure is to provide a system and method for estimating a concentration of hydrogen in a fuel cell, which implement improved accuracy by more accurately estimating an initial concentration of hydrogen at the time of starting of the fuel cell when the fuel cell is turned off, based on a change in a concentration of hydrogen in an anode.

According to an exemplary embodiment of the present disclosure, a system for estimating a concentration of hydrogen in a fuel cell may include: the fuel cell receiving hydrogen and oxygen to generate power; a hydrogen supply line re-circulating hydrogen discharged from the fuel cell and supplying the hydrogen to the fuel cell; a time measurement unit configured to measure a time duration from a point in time when an operation of the fuel cell ends to a point in time when the fuel cell restarts; an air amount estimation unit configured to estimate an amount of air introduced into the fuel cell during the time duration using the time duration measured by the time measurement unit; and a concentration estimation unit configured to estimate a concentration of hydrogen in the hydrogen supply line at the time of restarting the fuel cell based on the time duration measured by the time measurement unit and the amount of introduced air estimated by the air amount estimation unit.

The air amount estimation unit may be configured to measure a pressure of gas in the hydrogen supply line at the time of restarting the fuel cell, and estimate an amount of air introduced into a cathode of the fuel cell based on the measured pressure of gas in the hydrogen supply line. The air amount estimation unit may be configured to estimate the amount of introduced air using a difference between a reference pressure based on the measured time duration, and the measured pressure of gas in the hydrogen supply line.

The reference pressure may be pre-mapped based on the time duration and an operation temperature of the fuel cell at a point in time when the operation of the fuel cell ends, in a state in which air is not introduced into the fuel cell. The concentration estimation unit may be configured to estimate a final concentration by applying the amount of introduced air estimated by the air amount estimation unit to a reference concentration based on the measured time duration.

The reference concentration may be pre-mapped based on the time duration and an operation temperature of the fuel cell at the point in time when the operation of the fuel cell ends, in a state in which air is not introduced into the fuel cell. The concentration estimation unit may be configured to monitor the concentration of hydrogen in the hydrogen supply line by applying an amount of hydrogen that crosses over between an anode and a cathode of the fuel cell and an amount of purged hydrogen after the restarting of the fuel cell, to the concentration of hydrogen in the hydrogen supply line estimated at the time of restarting the fuel cell.

According to another exemplary embodiment of the present disclosure, a method for estimating a concentration of hydrogen in a fuel cell may include: measuring a time duration from a point in time when an operation of the fuel cell ends to a point in time when the fuel cell restarts; estimating an amount of air introduced into the fuel cell during the time duration using the measured time duration; and estimating a concentration of hydrogen in a hydrogen supply line at the time of restarting the fuel cell based on the basis of the measured time duration and the estimated amount of introduced air.

The method may further include, before estimating the amount of air introduced into the fuel cell, measuring a pressure of gas in the hydrogen supply line at the time of restarting the fuel cell. In estimating the amount of air introduced into the fuel cell, an amount of air introduced into a cathode of the fuel cell may be estimated using a difference between a reference pressure based on the measured time duration and the pressure of gas in the hydrogen supply line measured in the measuring of the pressure of gas.

In estimating the amount of air introduced into the fuel cell, when the measured time duration is equal to or greater than a preset time or more, the amount of air introduced into the fuel cell may be estimated under the assumption that a blocked region of an air supply line, and the hydrogen supply line constitute a single closed system. The method may further include, prior to measuring the time duration, storing an operation temperature of the fuel cell. The reference pressure may be pre-mapped based on the time duration and the operation temperature of the fuel cell at a point in time when the operation of the fuel cell ends, in a state in which air is not introduced into the fuel cell.

In the estimating of the concentration of hydrogen in the hydrogen supply line, a final concentration may be estimated by applying the amount of introduced air estimated in the estimating of the amount of air introduced into the fuel cell, to a reference concentration based on the measured time duration. The method may further include, prior to measuring the time duration, storing an operation temperature of the fuel cell. The reference concentration may be pre-mapped based on the time duration and the operation temperature of the fuel cell at a point in time when the operation of the fuel cell ends, in a state in which air is not introduced into the fuel cell.

Further, the method may include, after estimating the concentration of hydrogen in the hydrogen supply line, monitoring the concentration of hydrogen in the hydrogen supply line by applying an amount of hydrogen that crosses over between an anode and a cathode of the fuel cell and an amount of purged hydrogen after restarting the fuel cell, to the concentration of hydrogen in the hydrogen supply line estimated at the time of restarting the fuel cell. In the monitoring of the concentration of hydrogen in the hydrogen supply line, the concentration of hydrogen in the hydrogen supply line may be monitored by estimating concentrations of nitrogen and vapor at the time of restarting the fuel cell by using the concentration of hydrogen in the hydrogen supply line estimated at the time of restarting the fuel cell, and by applying amounts of nitrogen and vapor that cross over and amounts of purged nitrogen and vapor to the estimated concentrations of nitrogen and vapor, respectively.

DETAILED DESCRIPTION

Figure 1:
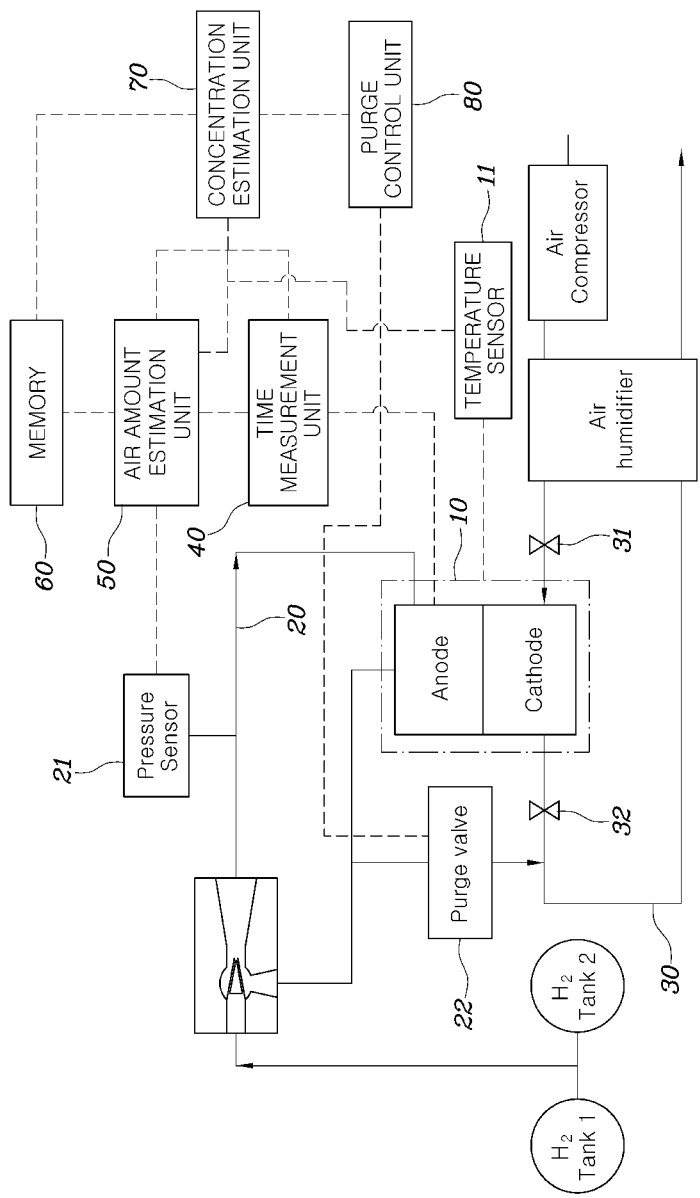
FIG. 1 is a diagram illustrating a configuration of a system for estimating a concentration of hydrogen in a fuel cell according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions will be provided only in order to describe various exemplary embodiments of the present disclosure disclosed in the present specification or application. Therefore, exemplary embodiments of the present disclosure may be implemented in various forms, and the present disclosure is not to be interpreted as being limited to exemplary embodiments described in the present specification or application Since exemplary embodiments of the present disclosure may be various modified and may have several forms, specific embodiments will be shown in the accompanying drawings and will be described in detail in the present specification or application. However, it is to be understood that the present disclosure is not limited to specific embodiments, but includes all modifications, equivalents, and substitutions included in the spirit and the scope of the present disclosure.

Terms such as "first", "second", etc., may be used to describe various components, but the components are not to be construed as being limited to the terms. The terms are used only to distinguish one component from another component. For example, the "first" component may be named the "second" component and the "second" component may also be similarly named the "first" component, without departing from the scope of the present disclosure.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element interposed therebetween. Other expressions describing a relationship between components, that is, "between", "directly between", "neighboring to", "directly neighboring to" and the like, should be similarly interpreted. Terms used in the present specification are used only in order to describe specific embodiments rather than limiting the present disclosure.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present disclosure will be described in detail with reference to the accompanying drawings. Like reference numerals proposed in each drawing denote like components.

FIG. 1 is a diagram illustrating a configuration of a system for estimating a concentration of hydrogen in a fuel cell 10 according to an exemplary embodiment of the present disclosure. Referring to FIG. 1, the system for estimating a concentration of hydrogen in the fuel cell 10 according to an exemplary embodiment of the present disclosure may include: the fuel cell 10 receiving hydrogen and oxygen to generate power; a hydrogen supply line 20 re-circulating hydrogen discharged from the fuel cell 10 and supplying the hydrogen to the fuel cell 10; a time measurement unit 40 configured to measure a time duration from a point in time when an operation of the fuel cell 10 ends to a point in time when the fuel cell 10 restarts; an air amount estimation unit 50 configured to estimate an amount of air introduced into the fuel cell 10 during the time duration using the measured time duration; and a concentration estimation unit 70 configured to estimate a concentration of hydrogen in the hydrogen supply line 20 at the time of restarting the fuel cell 10 based on the measured time duration and the estimated amount of introduced air. Notably, the various units of the system may be operated by a controller having a processor and a memory. Additionally, the various units may include sensors operated by the controller specifically programed to operate the units.

The fuel cell 10 may be a fuel cell stack 10 including a membrane electrode assembly (MEA). Oxygen in the air and hydrogen may chemically react with each other in the fuel cell 10 to generate electric energy. The hydrogen supply line 20 may be connected to an anode of the fuel cell 10 to supply hydrogen to the fuel cell 10. Particularly, the hydrogen supply line 20 may be connected so that hydrogen discharged from an outlet of the fuel cell 10 is re-circulated into an inlet of the fuel cell 10. The air amount estimation unit 50 may be configured to measure a pressure of gas in the hydrogen supply line 20 at the time of restarting the fuel cell 10, and estimate an amount of air introduced into a cathode of the fuel cell 10 based on the measured pressure of gas in the hydrogen supply line 20.

The hydrogen supply line 20 may include a pressure sensor 21 configured to measure a pressure in the hydrogen supply line 20. The air amount estimation unit 50 may be configured to estimate the amount of introduced air using a difference between a reference pressure based on the measured time duration, and the measured pressure of gas in the hydrogen supply line 20. The reference pressure may be pre-mapped based on the time duration and an operation temperature of the fuel cell 10 in a state in which air is not introduced into the fuel cell 10. In particular, the operation temperature of the fuel cell 10 may be a temperature at a point in time when the operation ends.

The time measurement unit 40, the air amount estimation unit 50 concentration estimation unit 70 and a purge controller 80 according to an exemplary embodiment of the present disclosure may be implemented through a non-transitory memory (not shown) configured to store data with respect to algorithms configured to execute operations of various components in the vehicle or software instructions reproducing the algorithms, and a processor (not shown) configured to perform the operations described hereinafter by using the data stored in the memory. Herein, the memory and the processor may be implemented as separate chips. Alternatively, the memory and the processor may be implemented as a single chip integrated with each other. The processor may take the form of one or more processor(s).

The concentration estimation unit 70 may be configured to estimate a final concentration by applying the amount of introduced air estimated by the air amount estimation unit 50 to a reference concentration based on the measured time duration. The reference concentration may be pre-mapped based on the time duration and the operation temperature of the fuel cell 10 in a state in which air is not introduced into the fuel cell 10. In particular, the operation temperature of the fuel cell 10 may be a temperature at a point in time when the operation ends. The concentration estimation unit 70 may be configured to monitor a concentration of hydrogen in the hydrogen supply line 20 by applying an amount of hydrogen that crosses over between the anode and the cathode of the fuel cell 10 and an amount of purged hydrogen after restarting the fuel cell 10, to the concentration of hydrogen in the hydrogen supply line 20 estimated at the time of restarting the fuel cell 10.

A purge controller 80 may be configured to execute and adjust a purge of the hydrogen supply line 20 using the concentration of hydrogen in the hydrogen supply line 20 monitored by the concentration estimation unit 70. Particularly, the purge controller 80 may be configured to execute and adjust the purge by opening a purge valve 22 of the hydrogen supply line 20 that is positioned adjacent to the outlet of the fuel cell 10. The gas including hydrogen in the hydrogen supply line 20 is discharged to the outside by the purge control in which the purge valve 22 is opened.

As the purge control is performed, the gas including impurities such as nitrogen in the hydrogen supply line 20 may be discharged to the outside and pure hydrogen is supplied, such that a concentration of hydrogen in the hydrogen supply line 20 may be maintained. According to an exemplary embodiment, the purge controller 80 may be configured to operate the purge valve 22 to be opened when the concentration of hydrogen in the hydrogen supply line 20 estimated by the concentration estimation unit 70 is equal to or less than a preset hydrogen concentration (e.g., about 60%).

Figure 2:
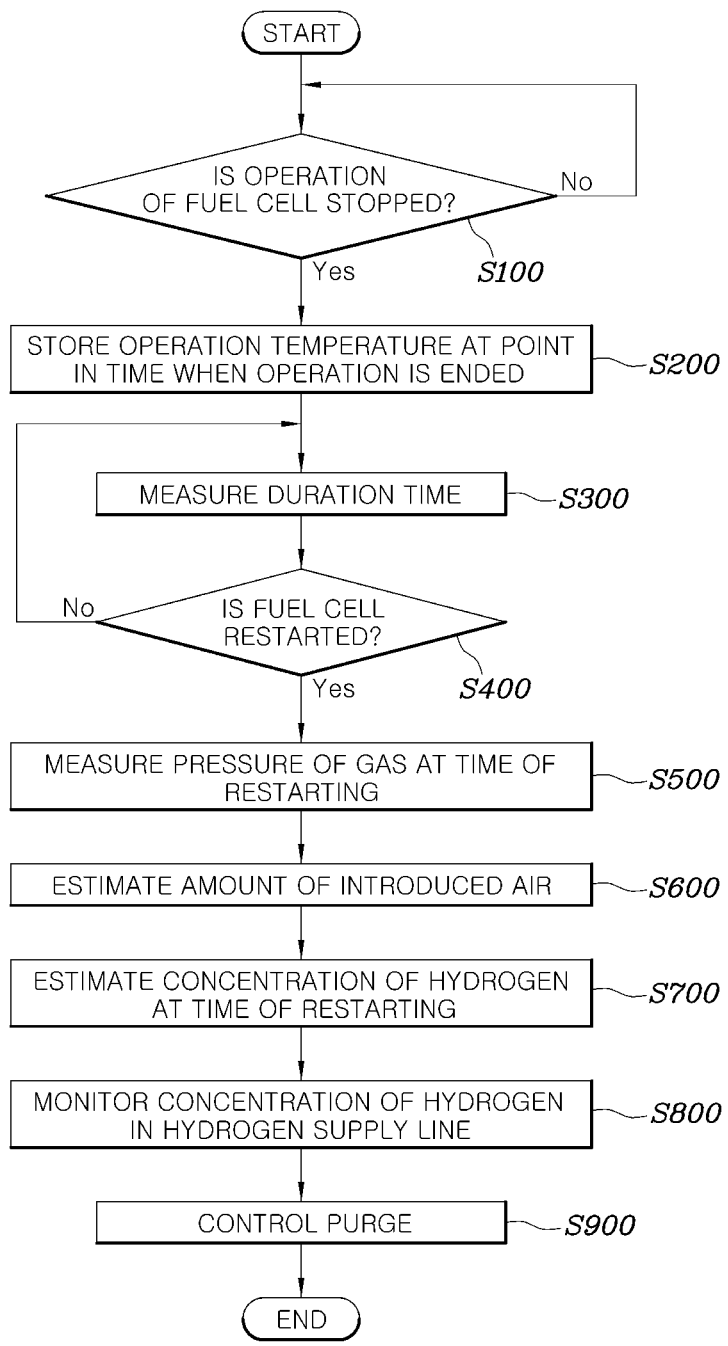
FIG. 2 is a flowchart illustrating a method for estimating a concentration of hydrogen in a fuel cell according to an exemplary embodiment of the present disclosure.

FIG. 2 is a flowchart illustrating a method for estimating a concentration of hydrogen in the fuel cell 10 according to an exemplary embodiment of the present disclosure. The method described herein below may be executed by the controller. Referring to FIG. 2, the method for estimating a concentration of hydrogen in the fuel cell 10 according to an exemplary embodiment of the present disclosure may include: measuring a time duration from a point in time when an operation of the fuel cell 10 ends to a point in time when the fuel cell 10 restarts (S300); estimating an amount of air introduced into the fuel cell 10 during the time duration using the measured time duration (S600); and estimating a concentration of hydrogen in the hydrogen supply line 20 at the time of restarting the fuel cell 10 based on the measured time duration and the estimated amount of introduced air (S700).

According to the related art, the concentration of hydrogen in the hydrogen supply line 20 has been estimated at the time of restarting the fuel cell 10 based on a hydrogen concentration map with respect to the time duration until the restarting of the fuel cell 10, when the operation of the fuel cell 10 ends according to a turn-off signal of the fuel cell 10 or a vehicle using the fuel cell 10. Although an air supply line of the fuel cell 10 is operated to be closed in a state (S100) in which the operation of the fuel cell 10 is ended, an air leakage may occur in an air supply valve 31 or an air cut valve 32 of the air supply line, and an amount of leaked air may widely vary for each product.

Therefore, according to the present disclosure, the amount of air introduced into the fuel cell 10 may be estimated in the state in which the operation of the fuel cell 10 has ended, and the concentration of hydrogen in the hydrogen supply line 20 may be estimated at the time of restarting the fuel cell 10 by applying the estimated amount of introduced air, to more accurately estimate the concentration of hydrogen. In the measuring of the time duration (S300), a time duration from a point in time when the operation of the fuel cell 10 ends (S100) to a point in time when the fuel cell 10 restarts (S400) may be counted to measure the time duration. The point in time when the operation of the fuel cell 10 ends may be a point in time when the air supply to the fuel cell 10 is cut off.

More specifically, the method for estimating a concentration of hydrogen in the fuel cell 10 may further include, prior to estimating the amount of air introduced into the fuel cell 10, measuring a pressure of gas in the hydrogen supply line 20 at the time of restarting the fuel cell 10 (S500). In the estimating of the amount of air introduced into the fuel cell 10, an amount of air introduced into the cathode of the fuel cell 10 may be estimated using a difference between the reference pressure based on the measured time duration and the pressure of gas in the hydrogen supply line 20 measured in the measuring of the pressure of gas (S500).

Particularly, in estimating the amount of air introduced into the fuel cell 10 (S600), when the measured time duration is equal to or greater than a preset time, the amount of air introduced into the fuel cell 10 may be estimated under the assumption that a blocked region of the air supply line, and the hydrogen supply line 20 constitute a single closed system. The preset time may be, for example, about one hour. When the measured time duration is equal to or greater than the preset time, a composition of gas in the anode and a composition of gas in the cathode may become substantially the same as each other by a crossover between the anode and the cathode of the fuel cell 10. In particular, it may be assumed that residual oxygen is consumed and amounts of hydrogen, nitrogen, and vapor are maintained constant in the hydrogen supply line 20, and the blocked region of the air supply line. Further, it may be assumed that in the case where the measured time duration is equal to or greater than the preset time, even when the air is introduced into the cathode of the fuel cell 10 from the outside, the air is diffused within the single closed system.

Figure 3:
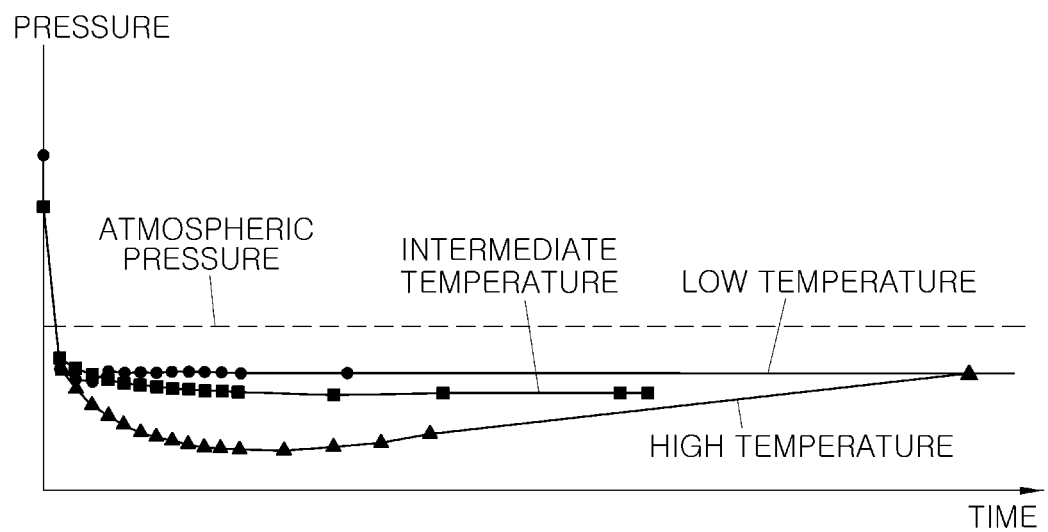
FIG. 3 illustrates a pressure map of a hydrogen supply line with respect to a time duration according to an exemplary embodiment of the present disclosure.

FIG. 3 illustrates a pressure map of the hydrogen supply line 20 with respect to the time duration according to an exemplary embodiment of the present disclosure. Referring to FIG. 3, the method for estimating a concentration of hydrogen in the fuel cell 10 may further include, prior to measuring the time duration (S300), storing an operation temperature of the fuel cell 10 (S200). In particular, the operation temperature of the fuel cell 10 may be a temperature at a point in time when the operation is ends.

Specifically, the operation temperature of the fuel cell 10 may be measured by a temperature sensor 11. According to exemplary embodiment, the operation temperature of the fuel cell 10 may be estimated by measuring a temperature of coolant discharged to the outlet of the fuel cell 10 using the temperature sensor 11. In the storing of the operation temperature of the fuel cell 10 (S200), the operation temperature of the fuel cell 10 may be stored in a memory 60 at a point in time when the operation of the fuel cell 10 ends and air supply to the fuel cell 10 is thus cut off.

A reference pressure stored in the memory 60 may be pre-mapped based on the time duration and the operation temperature of the fuel cell 10 in a state in which air is not introduced into the fuel cell 10. In particular, the operation temperature of the fuel cell 10 may be a temperature at a point in time when the operation ends. The reference pressure may be pre-mapped through an experiment or the like in a state in which air is not introduced into the fuel cell 10 as the hydrogen supply line 20 and the blocked region of the air supply line are completely closed when the operation of the fuel cell 10 ends. The higher the operation temperature of the fuel cell 10, the greater the decrease in a partial pressure of vapor, and thus the pressure in the hydrogen supply line 20 may be substantially decreased in the initial stage after the operation of the fuel cell 10 ends.

As illustrated in FIG. 3, the higher the operation temperature of the fuel cell 10, the higher the vapor pressure in a state in which the fuel cell 10 is operated, and when a temperature of the hydrogen supply line 20 is decreased as the operation of the fuel cell 10 ends, an amount of condensed vapor may be substantially increased, such that the pressure may be substantially decreased.

Therefore, the reference pressure may be pre-mapped based on the time duration after the operation ends and also based on the operation temperature of the fuel cell 10 at the point in time when the operation of the fuel cell 10 ends. More specifically, when the measured pressure of gas in the hydrogen supply line 20 is equal to or less than the reference pressure, the amount of air introduced into the fuel cell 10 may be determined to be 0.

Further, when the estimated amount of air introduced into the fuel cell 10 is 0, in the estimating of the concentration of hydrogen in the hydrogen supply line 20 (S700), the concentration of hydrogen in the hydrogen supply line 20 may be estimated as a reference concentration pre-stored in the memory 60. On the contrary, when the measured pressure of gas in the hydrogen supply line 20 is greater than the reference pressure, the amount of air introduced into the fuel cell 10 may be estimated.

According to an exemplary embodiment, when it is assumed that an amount of gas in the inside of the fuel cell 10 is $n_{Tot}$ mol in a state in which air is not introduced from the outside, in the case where x mol of air is introduced into the fuel cell 10 from the outside, an amount of gas in the inside of the fuel cell 10 may ben $T_{ot}$+x mol.

Particularly, the inside of the fuel cell 10 may be the inside of the blocked region of the air supply line, and the hydrogen supply line 20 which are assumed as constituting a single closed system.

Further, since residual oxygen is completely consumed, the amount of gas in the inside of the fuel cell 10 in a state in which the air is not introduced from the outside may be expressed as the sum of amounts of nitrogen, hydrogen, and vapor, as represented by the following equation.

$$n_{Tot} = n_{N2} + n_{H2} + n_{Vap}$$

Further, when it is assumed that a concentration of oxygen and a concentration of nitrogen in the air introduced from the outside are about 20% and 80%, respectively, the amount of gas in the inside of the fuel cell 10 may be represented by the following equation.

$$n_{Tot} + x = n_{Tot} - 0.4x + 0.4x + 0.2x + 0.8x$$

Particularly, water is produced when 0.4x mol of hydrogen and 0.2x mol of oxygen react with each other, and thus in the case where x mol of air is introduced, 0.4x mol of hydrogen and 0.2x mol of oxygen are removed, such that the amount of gas in the inside of the fuel cell 10 may be increased by 0.4x mol.

In other words, when x mol of gas is introduced into the fuel cell 10, the amount of nitrogen is increased by 0.8x mol, and the amount of hydrogen is decreased by 0.4x mol, such that a total amount of gas contained in the fuel cell 10 may be increased as indicated below.

$$n_{Tot} - 0.4x + 0.8x$$

$$n_{Tot} + 0.4x$$

Therefore, a pressure P' of gas in the hydrogen supply line 20 measured at the time of restarting and a reference pressure P may be represented by the following equations, respectively. In particular, $V_{st}$ may represent a volume of the inside of the blocked region of the air supply line and the hydrogen supply line 20 which are assumed as constituting a single closed system, R may represent the gas constant, and T may represent a temperature of the inside of the hydrogen supply line 20 (or a temperature of the fuel cell 10) at the time of restarting.

$$P' = (n_{Tot} + 0.4x)\frac{RT}{V_{St}}$$

$$P = n_{Tot}\frac{RT}{V_{St}}$$

Accordingly, a pressure difference ΔP between the pressure P' of gas in the hydrogen supply line 20 measured at the time of restarting and the reference pressure P may be represented by the following equation, and the amount (x mol) of air introduced into the fuel cell 10 may be estimated as indicated below $$\Delta P = \frac{0.4xRT}{V_{St}}$$

$$x = \frac{\Delta P V_{St}}{0.4RT}$$

Figure 4:
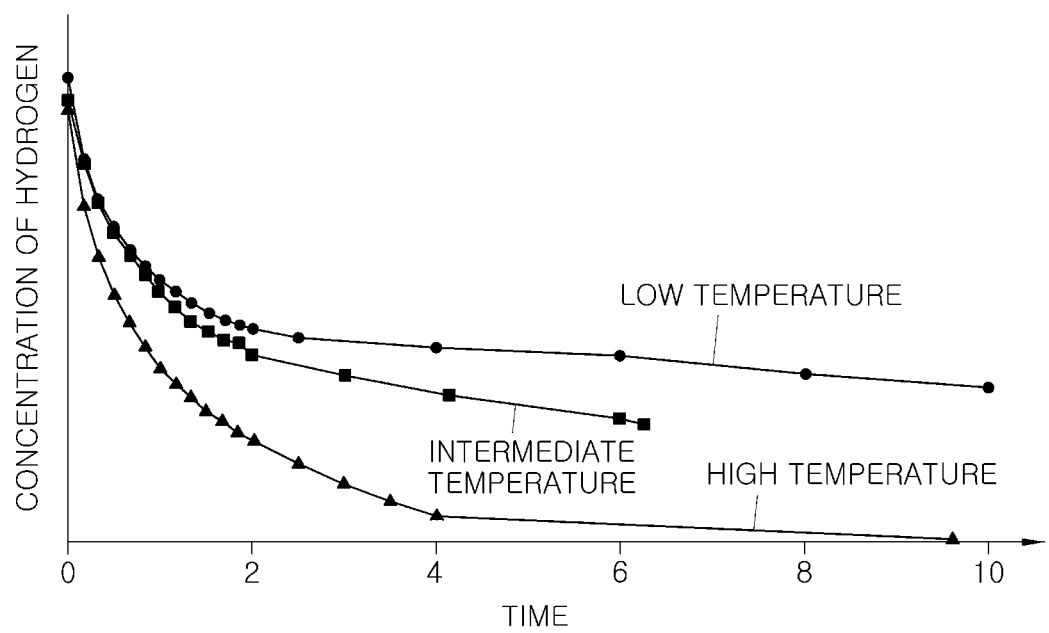
FIG. 4 illustrates a hydrogen concentration map of the hydrogen supply line with respect to the time duration according to an exemplary embodiment of the present disclosure.

FIG. 4 illustrates a hydrogen concentration map of the hydrogen supply line 20 with respect to the time duration according to an exemplary embodiment of the present disclosure. Referring to FIG. 4, in the estimating of the concentration of hydrogen in the hydrogen supply line 20 (S700), a final concentration may be estimated by applying the amount of introduced air estimated by the air amount estimation unit 50 to the reference concentration based on the measured time duration.

In particular, the method for estimating a concentration of hydrogen in the fuel cell 10 may further include, prior to measuring the time duration (S300), storing the operation temperature of the fuel cell 10 at the point in time when the operation of the fuel cell 10 ends, in which the reference concentration may be pre-mapped based on the time duration and the operation temperature of the fuel cell 10 at the point in time when the operation of the fuel cell 10 ends, in a state in which air is not introduced into the fuel cell 10.

The reference concentration may be pre-mapped through an experiment or the like in a state in which air is not introduced into the fuel cell 10 as the hydrogen supply line 20 and the blocked region of the air supply line are completely closed when the operation of the fuel cell 10 ends. The higher the operation temperature of the fuel cell 10 at the point in time when the operation of the fuel cell 10 ends, the greater the decrease in the reference concentration of hydrogen may be. The partial pressure of vapor may cause such a phenomenon.

In the estimating of the concentration of hydrogen in the hydrogen supply line 20 (S700), the final concentration may be estimated by applying the estimated amount of introduced air to the reference concentration. A final amount of nitrogen and a final amount of hydrogen may be obtained by correcting a reference amount ($n_{N_2}$) of nitrogen and a reference amount ($n_{H_2}$) of hydrogen by using the estimated amount (x mol) of air introduced into the fuel cell 10, as indicated below.

$$\bar{n}_{N_2} = n_{N_2} + 0.8x$$

$$\bar{n}_{H_2} = n_{H_2} - 0.4x$$

The reference amount ($n_{H_2}$) of hydrogen may be calculated from the reference concentration of hydrogen using a gas equation relating a pressure and a volume of the closed system, and the reference amount ($n_{N_2}$) of nitrogen may be calculated by subtracting the reference amount ($n_{H_2}$) of hydrogen and the amount of vapor from a total amount of gas.

Particularly, a final concentration (H$_2$–Cnc) of hydrogen obtained by applying the estimated amount (x mol) of air introduced into the fuel cell 10 may be estimated as indicated below.

$$H_2\_Cnc = \frac{\bar{n}_{H_2}}{\bar{n}_{H_2} + \bar{n}_{N_2}} = \frac{n_{H_2} - 0.4x}{n_{N_2} + n_{H_2} + 0.4x}$$

The method for estimating a concentration of hydrogen in the fuel cell 10 may further include, after estimating the concentration of hydrogen in the hydrogen supply line 20 (S700), monitoring the concentration of hydrogen in the hydrogen supply line 20 by applying an amount of hydrogen that crosses over between the anode and the cathode of the fuel cell 10 and an amount of purged hydrogen after restarting the fuel cell 10, to the concentration of hydrogen in the hydrogen supply line 20 estimated at the time of restarting the fuel cell 10 (S800).

In particular, in the monitoring of the concentration of hydrogen in the hydrogen supply line 20 (S800), the concentration of hydrogen in the hydrogen supply line 20 may be monitored by estimating concentrations of nitrogen and vapor at the time of restarting the fuel cell 10 by using the concentration of hydrogen in the hydrogen supply line 20 estimated at the time of restarting the fuel cell 10, and by applying amounts of nitrogen and vapor that cross over and amounts of purged nitrogen and vapor to the estimated concentrations of nitrogen and vapor, respectively.

The concentration of hydrogen in the hydrogen supply line 20 may be monitored using an amount of hydrogen calculated by subtracting an amount of nitrogen and an amount of vapor from a total amount of gas in the hydrogen supply line 20. The total amount ($n_{An}$) of gas in the hydrogen supply line 20 may be estimated using an ideal gas equation relating a pressure P, a volume V, and a temperature T of gas in the hydrogen supply line 20 as below.

$$n_{An} = \frac{P_{An} V_{An}}{RT} \, [\text{mol}]$$

wherein, R represents the gas constant of 8.314 J/molK

A gas diffusion rate may be in inverse proportion to a thickness of an electrolyte membrane of the fuel cell stack 10 and may be in proportion to a difference in partial pressure of gas between the anode and the cathode. Specifically, an amount of gas that crosses over may be calculated by applying the FICK's law (law of diffusion) as below.

$$\frac{\dot{m}}{A} = -D\frac{\partial c}{\partial x} = -D\frac{M}{RT}\frac{\partial P}{\partial x}$$

wherein, ṁ represents a mass diffusion rate (g/s) of gas, A represents a diffusion area, D represents a diffusion coefficient of gas, x represents a diffusion distance, c represents a concentration of gas, R represents the universal gas constant (8.314 J/mol), P represents a pressure of gas, T represents a temperature of gas, and M represents a molar mass (g/mol) of gas. This may be represented as below.

$$\dot{m} = -D\frac{M}{RT}\frac{\partial P}{\partial x}A = \dot{n} \cdot M$$

$$\dot{n} = -D\frac{1}{RT}\frac{\partial P}{\partial x}A$$

wherein, ṅ is a diffusion rate (mol/s) of gas.

In other words, the amount of gas that crosses over through the electrolyte membrane of the fuel cell 10 may be calculated using the following equation $$\dot{n}_{N2\_xo} = \frac{D_{N2}}{RT}\frac{P_{Ca,N2} - P_{An,N2}}{\delta}A$$

wherein, $\dot{n}_{N2\_xo}$ represents a diffusion rate of nitrogen, P represents a pressure (kPa), R represents the gas constant (8.314 J/mol/K), T represents a temperature (K), D represents a diffusion coefficient, A represents an area of the electrolyte membrane, δ represents a thickness of the electrolyte membrane, $P_{Ca,N2}$ represents a partial pressure of nitrogen in the cathode of the fuel cell 10, and $P_{Am,H2}$ represents a partial pressure of nitrogen in the anode of the fuel cell 10.

$$\dot{n}_{V\_xo} = \frac{D_V}{RT}\frac{P_{Ca,V} - P_{An,V}}{\delta}A$$

wherein, $\dot{n}_{V\_xo}$ represents a diffusion rate of vapor, P represents a pressure (kPa), R represents the gas constant (8.314 J/mol/K), T represents a temperature (K), D represents a diffusion coefficient, A represents an area of the electrolyte membrane, δ represents a thickness of the electrolyte membrane, $P_{Ca,V}$ represents a partial pressure of vapor in the cathode of the fuel cell 10, and $P_{ANT}$ represents a partial pressure of vapor in the anode of the fuel cell 10.

Unlike nitrogen and vapor, hydrogen may cross over from the anode to the cathode of the fuel cell 10.

$$\dot{n}_{H2\_xo} = \frac{D_{H2}}{RT}\frac{P_{An,H2} - P_{Ca,H2}}{\delta}A$$

wherein, $\dot{n}_{H2\_xo}$ represents a diffusion rate of hydrogen, P represents a pressure (kPa), R represents the gas constant (8.314 J/mol/K), T represents a temperature (K), D represents a diffusion coefficient A represents an area of the electrolyte membrane, δ represents a thickness of the electrolyte membrane, $P_{An,H2}$ represents a partial pressure of hydrogen in the anode of the fuel cell 10, and $P_{CaH2}$ represents a partial pressure of hydrogen in the cathode of the fuel cell 10.

Further, the diffusion rate of gas may be in proportion to the diffusion coefficient of gas, and the diffusion coefficient of gas may vary based on an amount of water contained in the electrolyte membrane positioned between the anode and the cathode of the fuel cell 10, and the temperature. As the diffusion coefficient (D) of gas, a fixed constant value may be used. However, a value varying based on a state of the fuel cell 10, such as a degree of deterioration and the temperature, may also be used to further increase accuracy. More specifically, the diffusion coefficient (D) of gas may be calculated using a value yawing based on an amount of water contained in the electrolyte membrane positioned between the anode and the cathode of the fuel cell 10, and the temperature. In addition, the diffusion coefficient (D) of gas may be calculated using a value varying as the electrolyte membrane deteriorates.

A purge rate ($\dot{n}_{purge}$) of gas may be in proportion to a difference between a pressure ($P_{AN}$) of gas in the anode and a pressure ($P_{out}$) of external gas. The pressure ($P_{out}$) of external gas may be a pressure of gas in the cathode. A specific equation may be as below.

$$\dot{n}_{purge} = C(P_{An} - P_{out})$$

wherein, C, which is a purge gain value, may be determined on the basis of a purge cycle, an opening degree of the purge valve 22 at the time of the purge, an opening time of the purge valve 22, and the like.

Particularly, a purge rate of each gas may be calculated using the following equations (a purge rate ($\dot{n}_{N2\_purge}$) of nitrogen, a purge rate ($\dot{n}_{V\_purge}$) of vapor, and a purge rate ($\dot{n}_{purge}$) of hyrdrogen).

$$n_{N2\_purge} = n_{purge} \cdot \frac{n_{N2}}{n_{An}}$$

$$n_{V\_purge} = n_{purge} \cdot \frac{n_{V}}{n_{An}}$$

$$n_{H2\_purge} = n_{purge} \cdot \frac{n_{H2}}{n_{An}}$$

Each of initial amounts of nitrogen and vapor in the hydrogen supply line 20 may be predicted and each of amounts of nitrogen and vapor that cross over from the anode and each of amounts of purged nitrogen and purged vapor may be calculated to calculate a current amount of nitrogen in the hydrogen supply line 20 based on the predicted initial amount of nitrogen, the amount of nitrogen that crosses over and the amount of purged nitrogen, and to calculate a current amount of vapor in the hydrogen supply line 20 based on the predicted initial amount of vapor, the amount of vapor that crosses over, and the amount of purged vapor.

In other words, the current amount of nitrogen and the current amount of vapor may be calculated by integrating a diffusion rate and a purge rate per unit time with respect to an initial amount, over time, with the equations above. A current amount of hydrogen may be calculated by subtracting the current amount of nitrogen and the current amount of vapor from the amount of gas in the hydrogen supply line 20. Therefore, the concentration of hydrogen in the hydrogen supply line 20 may be monitored by calculating all of the amount of gas, the current amount of nitrogen, the current amount of vapor, and the current amount of hydrogen in the hydrogen supply line 20 under the assumption that the concentration of gas in the hydrogen supply line 20 is constant.

As a result, it may be possible to continuously monitor a concentration of hydrogen by calculating the concentration of hydrogen that is difficult to estimate due to a reaction with oxygen and the like, by using an amount of nitrogen and an amount of vapor. In addition, the method for estimating a concentration of hydrogen in the fuel cell 10 may further include executing and adjusting a purge based on the monitored concentration of hydrogen in the hydrogen supply line 20 (S900).

In the executing of the purge (S900), the purge valve 22 may be operated to be opened when the concentration of hydrogen in the hydrogen supply line 20 is equal to or less than a predetermined concentration. Therefore, a more accurate estimation of the concentration of hydrogen is possible, such that it may be possible to prevent an unnecessary purge and properly control the purge to allow the concentration of hydrogen to be maintained at a predetermined level or higher. As a result, fuel efficiency and durability of the fuel cell 10 may be improved.

In the system and method for estimating a concentration of hydrogen in a fuel cell according to the present disclosure, it may be possible to more accurately estimate a concentration of hydrogen at the time of re-starting after an operation of the fuel cell is stopped. Further, accuracy in estimating a concentration of hydrogen during the operation of the fuel cell may be improved, such that durability and fuel efficiency of the fuel cell may be improved.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A method for estimating a concentration of hydrogen in a fuel cell, comprising:
   measuring, by a controller, a time duration from a point in time when an operation of the fuel cell ends to a point in time when the fuel cell restarts;
   estimating, by the controller, an amount of air introduced into the fuel cell during the time duration using the measured time duration;
   measuring, by the controller, a pressure of gas in the hydrogen supply line at the time of restarting the fuel cell; and thereafter
   estimating, by the controller, a concentration of hydrogen in a hydrogen supply line at the time of restarting the fuel cell based on the measured time duration and the estimated amount of introduced air; and
   performing, by the controller, a hydrogen purge control based on the estimated concentration of hydrogen,
   wherein in the estimating of the amount of air introduced into the fuel cell, an amount of air introduced into a cathode of the fuel cell is estimated using a difference between a reference pressure based on the measured time duration and the pressure of gas in the hydrogen supply line measured in the measuring of the pressure of gas.

2. The method of claim 1, wherein in the estimating of the amount of air introduced into the fuel cell, when the measured time duration is equal to or greater than a preset time or more, the amount of air introduced into the fuel cell is estimated under the assumption that a blocked region of an air supply line, and the hydrogen supply line constitute a single closed system.

3. The method of claim 1, further comprising,
   prior to measuring the time duration, storing, by the controller, an operation temperature of the fuel cell,
   wherein the reference pressure is pre-mapped based on the time duration and the operation temperature of the fuel cell in a state in which air is not introduced into the fuel cell.

4. The method of claim 1, wherein in estimating the concentration of hydrogen in the hydrogen supply line, a final concentration is estimated by applying the amount of introduced air estimated in the estimating of the amount of air introduced into the fuel cell, to a reference concentration based on the measured time duration.

5. The method of claim 4, further comprising,
   prior to measuring the time duration, storing, by the controller, an operation temperature of the fuel cell,
   wherein the reference concentration is pre-mapped based on the time duration and the operation temperature of the fuel cell in a state in which air is not introduced into the fuel cell.

6. The method of claim 1, further comprising, after estimating the concentration of hydrogen in the hydrogen supply line, monitoring, by the controller, the concentration of hydrogen in the hydrogen supply line by applying an amount of hydrogen that crosses over between an anode and a cathode of the fuel cell and an amount of purged hydrogen after the restarting of the fuel cell, to the concentration of hydrogen in the hydrogen supply line estimated at the time of restarting the fuel cell.

7. The method of claim 6, wherein in the monitoring of the concentration of hydrogen in the hydrogen supply line, the concentration of hydrogen in the hydrogen supply line is monitored by estimating concentrations of nitrogen and vapor at the time of restarting the fuel cell using the concentration of hydrogen in the hydrogen supply line estimated at the time of restarting the fuel cell, and by applying amounts of nitrogen and vapor that cross over and amounts of purged nitrogen and vapor to the estimated concentrations of nitrogen and vapor, respectively.

8. A method for estimating a concentration of hydrogen in a fuel cell, comprising:
- measuring, by a controller, a time duration from a point in time when an operation of the fuel cell ends to a point in time when the fuel cell restarts;
- estimating, by the controller, an amount of air introduced into the fuel cell during the time duration using the measured time duration;
- estimating, by the controller, a concentration of hydrogen in a hydrogen supply line at the time of restarting the fuel cell based on the measured time duration and the estimated amount of introduced air;
- after estimating the concentration of hydrogen in the hydrogen supply line, monitoring, by the controller, the concentration of hydrogen in the hydrogen supply line by applying an amount of hydrogen that crosses over between an anode and a cathode of the fuel cell and an amount of purged hydrogen after the restarting of the fuel cell, to the concentration of hydrogen in the hydrogen supply line estimated at the time of restarting the fuel cell; and
- performing, by the controller, a hydrogen purge control based on the estimated concentration of hydrogen.

9. The method of claim 8, wherein in the monitoring of the concentration of hydrogen in the hydrogen supply line, the concentration of hydrogen in the hydrogen supply line is monitored by estimating concentrations of nitrogen and vapor at the time of restarting the fuel cell using the concentration of hydrogen in the hydrogen supply line estimated at the time of restarting the fuel cell, and by applying amounts of nitrogen and vapor that cross over and amounts of purged nitrogen and vapor to the estimated concentrations of nitrogen and vapor, respectively.

* * * * *